United States Patent [19]
McEvoy et al.

[11] Patent Number: 6,060,197
[45] Date of Patent: May 9, 2000

[54] ZINC BASED ELECTROCHEMICAL CELL

[75] Inventors: John T. McEvoy, Sandy; Strahinja K. Zecevic; Ashok V. Joshi, both of Salt Lake City, all of Utah

[73] Assignee: Ceramtec, Inc., Salt Lake City, Utah

[21] Appl. No.: 09/213,337

[22] Filed: Dec. 17, 1998

Related U.S. Application Data

[60] Provisional application No. 60/070,522, Jan. 6, 1998.

[51] Int. Cl.$^7$ .................................................... H01M 4/42
[52] U.S. Cl. ........................... 429/229; 429/241; 429/166
[58] Field of Search .................................... 429/229, 224, 429/218.1, 241, 166, 168, 170

[56] References Cited

U.S. PATENT DOCUMENTS

| | | | |
|---|---|---|---|
| 4,007,054 | 2/1977 | Marincic et al. | 429/206 |
| 4,175,168 | 11/1979 | Armstrong et al. | 429/229 |
| 4,226,920 | 10/1980 | Armstrong | 429/94 |
| 5,639,578 | 6/1997 | Urry | 429/229 |

*Primary Examiner*—Maria Nuzzolillo
*Assistant Examiner*—Monique Wills
*Attorney, Agent, or Firm*—Factor & Partners

[57] ABSTRACT

An anode for use in an electrochemical cell, wherein the electrochemical cell includes a metallic casing, an electrolyte, a cathode, and an anode within the metallic casing. The anode comprises at least one perforated electrochemical zinc based sheet conductively attached to the metallic casing. A process for fabricating an electrochemical cell comprises the steps of fabricating an anode having at least one perforated electrochemical zinc based sheet conductively attached to a casing, associating a cathode with the electrochemical cell, associating an insulating microporous separator between the anode and cathode, and introducing an alkaline electrolyte to the anode and cathode through the microporous separator.

21 Claims, 4 Drawing Sheets

ZINC BASED ELECTROCHEMICAL CELL

This is a continuation of pending U.S. Provisional Application Ser. No. 60/070,522 filed Jan. 6, 1998.

BACKGROUND OF THE INVENTION

1. Field of the Invention

The present invention relates in general to primary electrochemical cells, and more particularly, to zinc alkaline—manganese dioxide cells having zinc anodes in the form of a wrapped and/or layered, expanded metal mesh attached to a zinc casing.

2. Background Art

It is well known that zinc alkaline—manganese dioxide cells perform better than chloride electrolyte based Leclanché cells and heavy duty zinc chloride cells, especially at continuous heavy duty drains. Alkaline batteries generally have two performance advantages over non-alkaline batteries. In particular, alkaline batteries exhibit greater energy densities and higher discharge rates compared to non-alkaline cells. Such preferable characteristics are achieved by increasing the amount and efficiency of active material as well as by reducing voltage loss. The three primary factors through which these improvements are realized include: 1) modifying cathode construction and configurations to increase the surface area of the electrode and current collectors, 2) using a highly conductive alkaline electrolyte to improve electrical conductivity of the electrolyte, and 3) using a powdered zinc anode instead of a zinc casing to further increase the surface area of the anode.

CATHODE CONFIGURATION

In cells that use the relatively new inside-out construction, the $MnO_2$ cathode, which is of the bobbin type in a Leclanché cell and a zinc chloride cell, is rearranged into the form of a sleeve and moved to the outer periphery of the cylindrical cell container. The zinc anode is in the form of a gelled zinc-powder and placed in the center of the cell. The main advantage of the $MnO_2$ cathode configuration is its reduced thickness, which results in higher efficiency of $MnO_2$ active material and lower cathode resistance. Additionally, the cross section for current passage is increasingly greater toward the current collector at the periphery of the cell. Furthermore, both the surface area and the conductivity of the steel-casing current collectors are much higher as compared to the carbon rod used in Leclanché and zinc chloride cells. All these factors give rise to a better current density distribution and lower IR voltage drop in the cathode, and consequently to lower voltage losses in the cell. In addition, the sleeve-form of the cathode takes less space in the periphery of the round cell, leaving more space for additional amounts of the active material. In this way the cathode active surface is increased leading to, among other things, a cathode with relatively low resistance.

ELECTROLYTE SELECTION

There are several advantages for using an alkaline KOH electrolyte as compared to a chloride containing electrolyte used in Leclanché and zinc chloride cells. The KOH electrolyte has higher electrode conductivity due to higher mobility of $OH^-$ ions (about 3 times higher than for other cations and anions except $H_3O^+$). The anode product $Zn(OH)_4^{2-}$ is soluble in KOH and consequently the cathode blocking effect, typical for Leclanché and zinc chloride cells, are almost absent. In Leclanché and zinc chloride cells, porous bobbin cathodes become progressively blocked with anode reaction products: $Zn(NH_3)_2Cl_2$ in $NH_4Cl$ electrolyte (Leclanché cell) and $Zn(OH)Cl$ in $ZnCl_2$ electrolyte (zinc chloride cell). In alkaline cells, however, the anode reaction product zincate ion $Zn(OH)_4^{2-}$ is soluble in the KOH electrolyte. Precipitation of solid $Zn(OH)_2$ and eventually ZnO occurs in the later stage of the battery discharge, when the electrolyte becomes saturated in zincate. Moreover, in an alkaline electrolyte, mass transport limitations are reduced. Furthermore, since the alkaline OH electrolyte has a much higher conductivity than chloride electrolyte, less electrolyte is needed in the cathode mix. Therefore, it is not necessary to have highly absorptive acetylene black. Instead, highly conductive graphite is used as a cathode additive. In this way the overall conductivity of the cathode mix is further increased resulting in a lowering of the overall cell internal resistance which, in turn, allows high battery discharge rates.

ANODE CONFIGURATION

Since the new cathode configuration and the use of alkaline electrolytes has significantly improved the $MnO_2$ cathode performance characteristics, the zinc anode performance need also be improved in order to obtain improved overall cell performance. Thus, the surface area of the zinc anode must also be increased or, otherwise, at high discharge rates, the current densities would be very high, resulting in high anode polarization and passivation of zinc. A zinc anode in the powder form has a very large surface area and therefore, such zinc has essentially no passivation tendency.

However, the inside-out construction of prior art cells using an alkaline electrolyte, and the use of gelled zinc powder as the anode have drawbacks as well. First, inasmuch as the negative zinc electrode is placed in the center of the cell, it is necessary to inverse the polarity of the cell. Inversing the polarity of the cell requires more parts and, consequently the cell is substantially more expensive to manufacture. Second, usage of powdered zinc electrode materials further makes the cell more expensive because the price of the zinc powder is quite high compared to that of non-powered zinc material, such as strips or cans.

High surface area zinc, which is necessary for high discharge rates, especially at very low temperatures, can also be obtained by use of an expanded zinc mesh foil, as described by W. A. Armstrong in U.S. Pat. No. 4,226,920. The expanded zinc strip is wound in the form of a coil, and disposed in the center of a cylindrical steel casing with a cathode arranged about the coil. Although a significant improvement in cell performance is achieved at low operating temperatures, this cell still suffers from the costly necessity of inverting the cell's polarity.

Other forms of zinc metal strips having enlarged surface areas have also been described in the prior art. U.S. Pat. No. 3,205,097 issued to R. R. Clune et al., describes a zinc electrode comprised of a corrugated strip of zinc. In U.S. Pat. No. 4,175,168 issued to W. A. Armstrong, discloses a zinc electrode prepared by folding, in a zigzag fashion, a strip of expanded or woven zinc for prismatic cells. However, such a design is not suitable for use in cylindrical cells, the configuration in which zinc alkaline - manganese dioxide cells are usually manufactured.

SUMMARY OF THE INVENTION

The present invention is generally directed to an electrochemical cell comprising: a) a casing constructed primarily from a metal; b) an anode having a perforated electrochemically zinc based active material conductively attached to the casing; c) a cathode; d) an insulating microporous separator positioned between the anode and cathode; and e) an alkaline electrolyte associated with the anode and cathode through the microporous separator.

In a preferred embodiment of the invention, the zinc based active material of the anode includes alloying elements such as indium, lead, gallium, bismuth, and mixtures thereof.

In another preferred embodiment of the invention, the electrochemical cell is preferably a button, a flat, or a cylindrical type cell. In such a cylindrical configuration, the perforated electrochemically zinc based active material is wound in a coil configuration. In the flat or button type configurations, the perforated electrochemically zinc based active material comprises at least one layer of material which is conductively associated with the casing.

In a preferred embodiment of the invention, the electrolyte preferably includes alkaline hydroxides such as Group 1A and Group 2A hydroxides.

The present invention is also directed to an electrochemical cell comprising: a) a casing constructed primarily from a metal; b) an anode having a perforated electrochemically zinc based active material conductively attached to the casing; c) a cathode structured to be substantially gas permeable and partially hydrophobic; d) an alkaline electrolyte in direct contact with the anode and cathode; e) an insulating grommet electrically insulating the casing from the gas permeable cathode; f) an outer casing having at least one aperture through which a gas may diffuse; and g) a gas permeable hydrophobic membrane positioned between the cathode and the aperture.

The present invention is also directed to a process for fabricating an electrochemical cell comprising the steps of: a) fabricating an anode having a perforated electrochemically zinc based active material conductively attached to a casing; b) associating a cathode with the electrochemical cell; c) associating an insulating microporous separator between the anode and cathode; and d) introducing an alkaline electrolyte to the anode and cathode through the microporous separator.

In a preferred embodiment of the process, the step of fabricating the anode includes the step of associating zinc, with alloying elements such as indium, lead, gallium, bismuth, and mixtures thereof.

In another preferred embodiment of the process, the step of fabricating the anode includes the step of attaching the anode to a button, a flat, or a cylindrical type casing. When fabricating a cylindrical type cell, the step of fabricating the anode preferably includes the step of winding the electrochemically zinc based active material into a coil configuration. When fabricating a button or a flat type cell, the step of fabricating the anode includes the step of applying at least one layer of the electrochemically zinc based active material onto a casing and, in turn, conductively attaching the at least one layer thereto.

In an another preferred embodiment of the invention, the step of introducing the electrolyte includes the step of introducing alkaline hydroxides such as Group 1A and Group 2A hydroxides.

BRIEF DESCRIPTION OF THE INVENTION

The invention will now be described with reference to the drawings wherein.

DETAILED DESCRIPTION OF THE INVENTION

Figure 1:
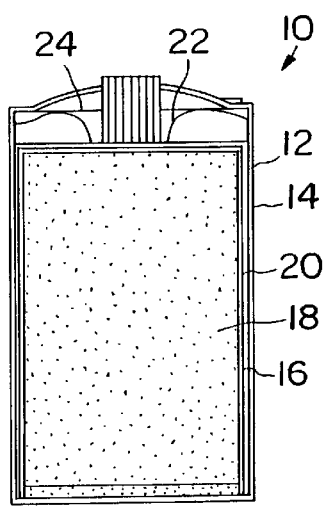
FIG. 1 is a cross-sectional view of a first embodiment of an electrochemical cell in accordance with the present invention.

While this invention is susceptible of embodiment in many different forms, there is shown in the drawings and will herein be described in detail specific embodiments with the understanding that the present disclosure is to be considered as an exemplification of the principles of the invention and is not intended to limit the invention to the embodiments illustrated.

Referring now to the drawings and to FIG. 1 in particular, a first embodiment of a present invention electrochemical cell 10 is shown as generally comprising casing 12, anode 14, electrolyte 16, cathode 18 and separator 20.

It will be understood that while casing 12 is shown, for illustrative purposes only, as substantially cylindrical, any one of a number of peripheral geometries are likewise contemplated for use. Outer casing 12 is preferably fabricated from a zinc alloy, however, other fabrication materials known to those having ordinary skill in the art are likewise contemplated for use.

Anode 14 is preferably fabricated from a sheet of perforated electrochemically zinc based active material. The term "perforated" is herein defined as any sheet of material having at least one aperture—such as a mesh or expanded metal. The anode sheet is wound in the form of a coil, and the coil is attached to and disposed within cylindrical casing 12 by, for example, spot welding. It will be understood that the zinc based active material of anode 14 can include alloying elements, such as indium, lead, gallium, or bismuth. Inasmuch as anode 14 utilizes relatively inexpensive zinc strips instead of the more expensive powdered zinc, manufacturing cost is kept to a minimum.

Anode 14 as well as the interior surface of can 12 is in direct contact with electrolyte 16. Electrolyte 16 is preferably an aqueous solution of NaOH or KOH, however, other aqueous alkaline solutions are also suitable for use, including, aqueous solutions of Group 1A and 2A hydroxides. It will be understood that electrolyte 16 can further include small amounts of zinc oxide, indium oxide and gelling agents to, among other things, suppress gassing within the cell. Such a gelling agent can include mixtures of sodium polyacrylate, acrylic acid and amorphous hydrophobic silicon dioxide, or sodium carboxymethyl cellulose. As will be discussed in greater detail below, electrolyte 16 conductively communicates with anode 14 and cathode 18 through a microporous separator 20.

Figure 2:
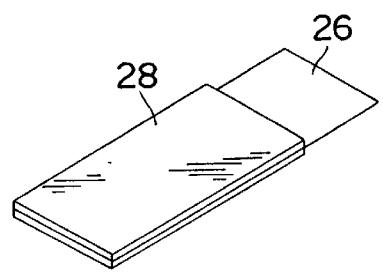
FIG. 2 is a perspective view of a cathode prior to fabrication in accordance with the present invention.

As shown in FIG. 2, in a cylindrical type electrochemical cell 10, cathode 18 preferably comprises current collector 26 coated with a cathode mix 28. For illustrative purposes only, current collector 26 comprises a nickel plated steel screen. Of Course, any one of a number of conventional current collectors that would be known to those having ordinary skill in the art are likewise contemplated for use. Cathode mix is preferably fabricated from $MnO_2$ mixed with graphite, carbon, and/or a Teflon binder. However, other metal oxides, including transition metal oxides, are also suitable for use within the cathode mix. Furthermore, while cathode 18 has been disclosed as being fabricated from a current collector sheet, it is likewise contemplated that current collector 18 can be fabricated from pelletized or gelled materials as well.

Figure 3:
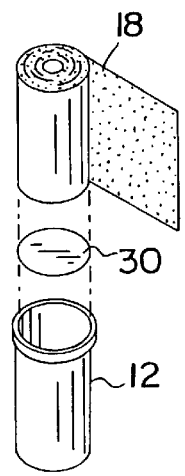
FIG. 3 is an exploded perspective view of, among other things, a cathode subsequent to fabrication in accordance with the present invention.

Upon fabrication, cathode mix 28 is pressed onto current collector 26, and is subsequently rolled up to form a cylindrical bobbin, as shown in FIG. 3. Cathode 18 is placed in the center of casing 12 and rests upon a paper washer 30.

Figure 6:
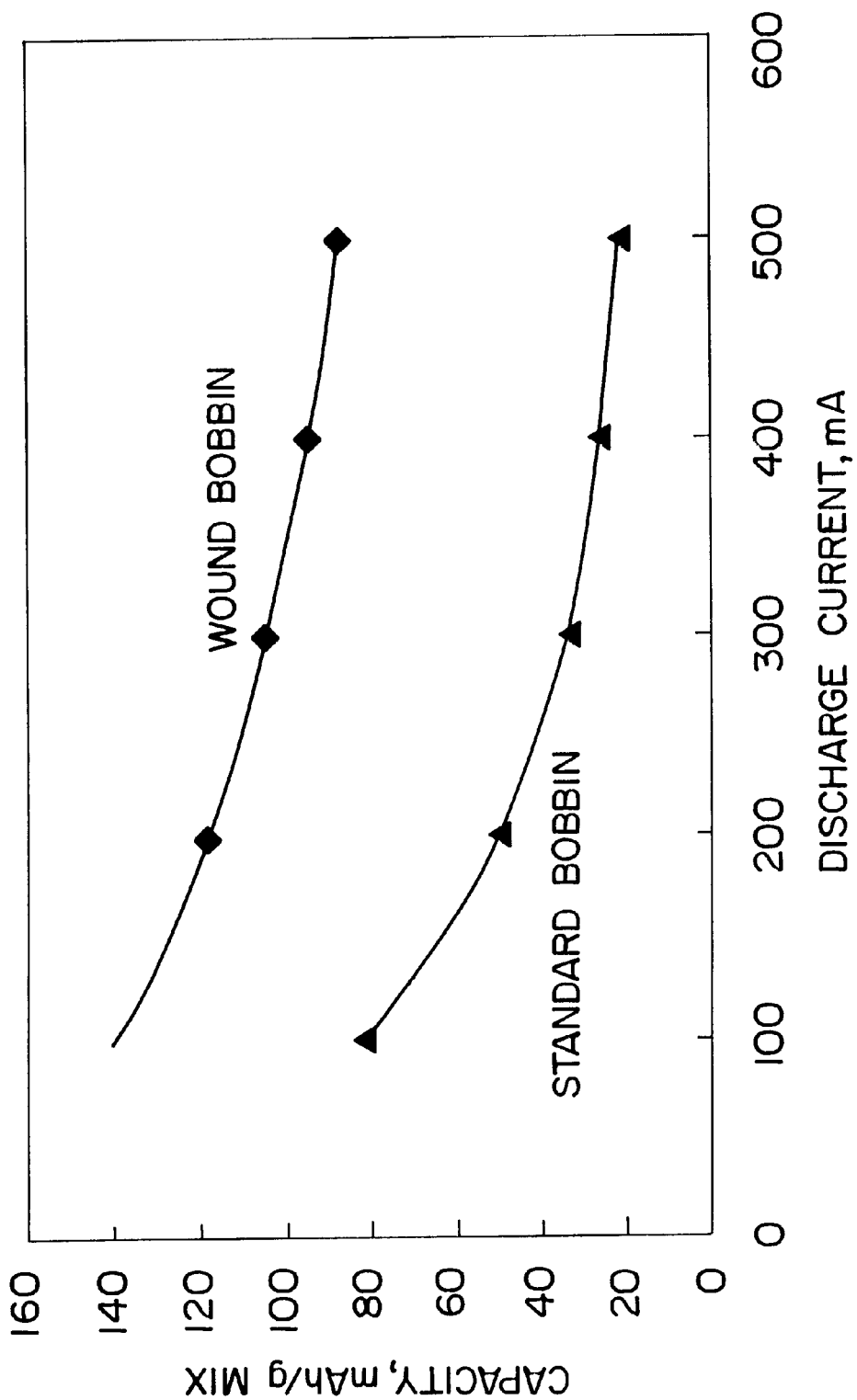
FIG. 6 is a graph of capacity verus discharge current density for a first embodiment electrochemical cell compared to a prior art cell.

Referring back to FIG. 1, cathode 18 is separated from anode 14 by separator 20. Separator 20 may comprise, for example, carboxymethyl cellulose coated paper or methyl cellulose coated paper. Inasmuch as the position of the cathode 18 is similar to that of conventional chloride electrolyte based batteries, it is not necessary to inverse to polarity of cell 10. As such, the cell construction is simpler, requiring fewer parts, and consequently less expensive to manufacture. Moreover, cathode 18 features a large surface area current collector 26, which is extremely thin. As such, the wound bobbin electrode configuration provides for high electrical conductivity that is necessary for high discharge rate batteries. Additionally, the thin electrode provides means for efficient electrochemical utilization of the active material which results in associated cells having performance characteristics that far surpass that of a conventional bobbin cathode as shown in FIG. 6.

Electrochemical cell 10 is also provided with top seal 22 which may be fabricated from wax or pitch that is poured onto the top of bobbin washer 24.

Figure 4:
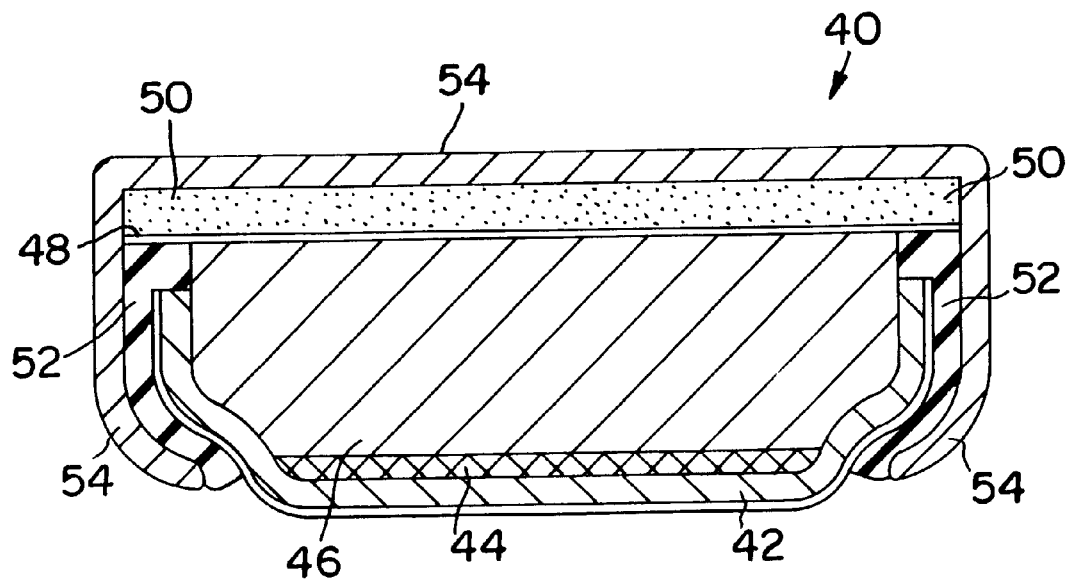
FIG. 4 is a cross-sectional view of a second embodiment of an electrochemical cell in accordance with the present invention.

A process for fabricating electrochemical cell 10 is contemplated as generally comprising: 1) fabricating an anode having at least one perforated electrochemically zinc based active material conductively attached to a casing; 2) associating a cathode with the electrochemical cell; 3) associating an insulating microporous separator between the anode and cathode; and 4) introducing an alkaline electrolyte to the anode and cathode through the microporous separator A second embodiment of an electrochemical cell 40 is shown in FIG. 4 as generally comprising first metal casing 42, anode 44, electrolyte 46, separator 48, cathode 50, grommet 52, and second metal casing 54.

It will be understood that while electrochemical cell 40 is shown, for illustrative purposes only, as a button type, any one of a number of cell configurations are likewise contemplated for use—including substantially flat cells.

First, casing 42 is fabricated primarily from a zinc alloy having an outer layer comprising copper, tin, stainless steel, or other metallic species. While first casing 42 is shown as substantially cup-shaped, several other geometric configurations are likewise contemplated for use.

Anode 44 is preferably a substantially circular zinc alloy mesh, and is conductively attached to the interior surface of first casing 42. The zinc alloy of anode 44 generally contains zinc metal with minimal amounts of impurities and further includes alloying elements such as lead, gallium, bismuth, or indium. As will be discussed in greater detail below, the zinc mesh and the interior surface of the first casing are in direct contact with electrolyte 46.

Electrolyte 46 is preferably an aqueous solution of NaOH or KOH, however, other aqueous alkaline solutions are also suitable for use, including, aqueous solutions of Group 1A and 2A hydroxides. It will be understood that electrolyte 46 can further include small amounts of zinc oxide, indium oxide and gelling agents to, among other things, suppress gassing within the cell. Such a gelling agent can include mixtures of sodium polyacrylate, acrylic acid and amorphous hydrophobic silicon dioxide, or sodium carboxymethyl cellulose. Electrolyte 46 is in direct contact with zinc mesh anode 44 and casing 42, and is also in constant communication between anode 44 and cathode 50 through microporous separator 48.

Cathode 50 is preferably fabricated from a thin sheet or pellet depending on the electrochemical reaction occurring at the cathode during discharge of the cell. In the case of, for example, Zn—$MnO_2$ and Zn—$Ag_2O$ cells, the cathode is preferably fabricated from pellets. Cathode 50 preferably comprises carbon as the conductive material metal oxide as the active material for the electrochemical reactions, and polytetrafluoroethylene dispersed throughout as the binder. This composite material is pressed into a second casing 54.

Second casing 54 is preferably fabricated from nickel plated steel. Grommet 52, preferably of nylon, electrically isolates first and second casings 42 and 54, respectively.

Optionally, a porous separator 48, such as cellophane, is positioned over the cathode to prevent contact between cathode 50 and anode 44—although such a separator is not a necessary component.

Figure 7:
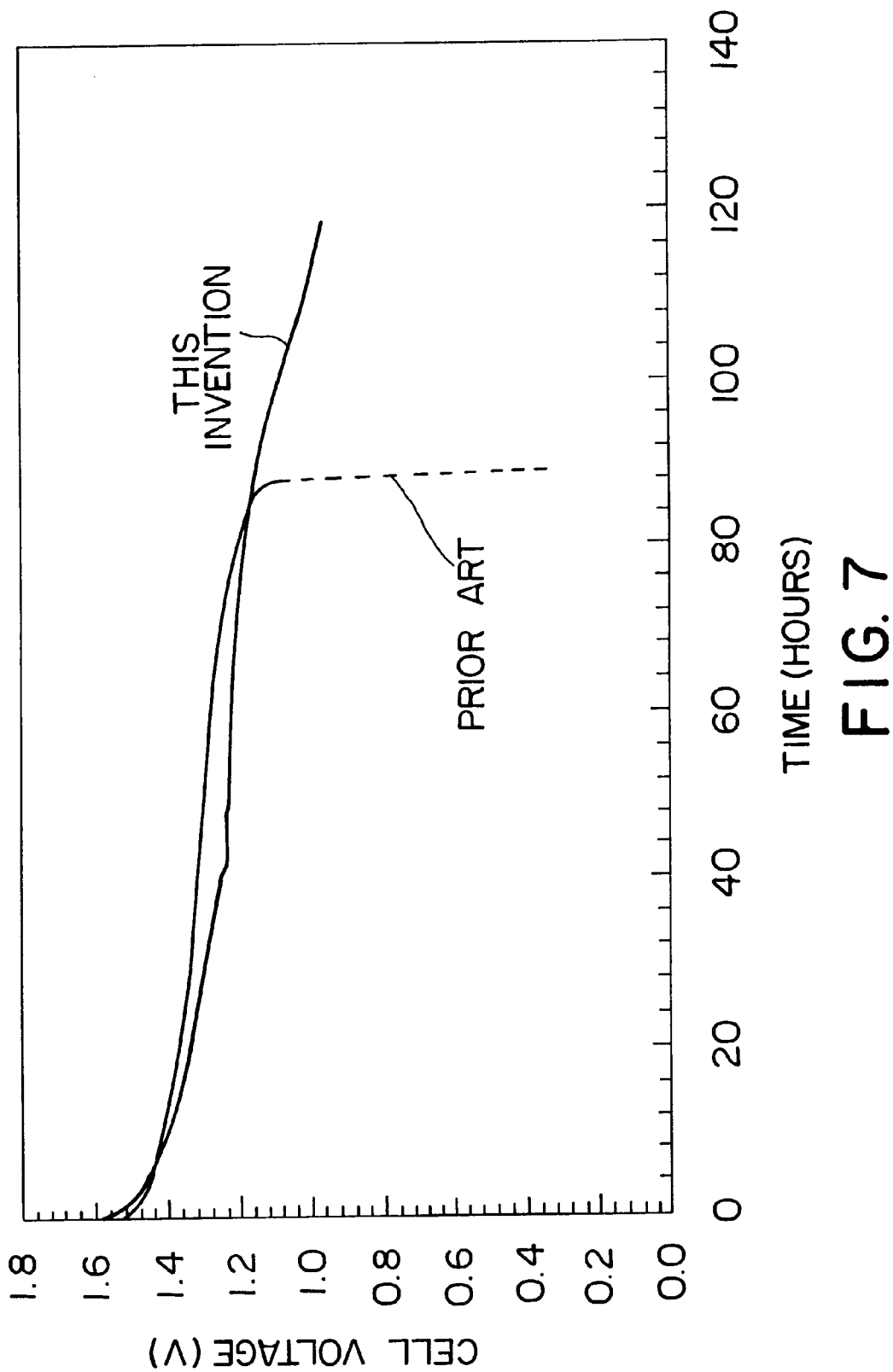
FIG. 7 is a graph of a discharge voltage verus time for a second embodiment electrochemical cell compared to a prior art cell.

As shown in FIG. 7, a cell constructed in accordance with cell 40 exhibits performance characteristics superior to that of a prior art cell.

Figure 5:
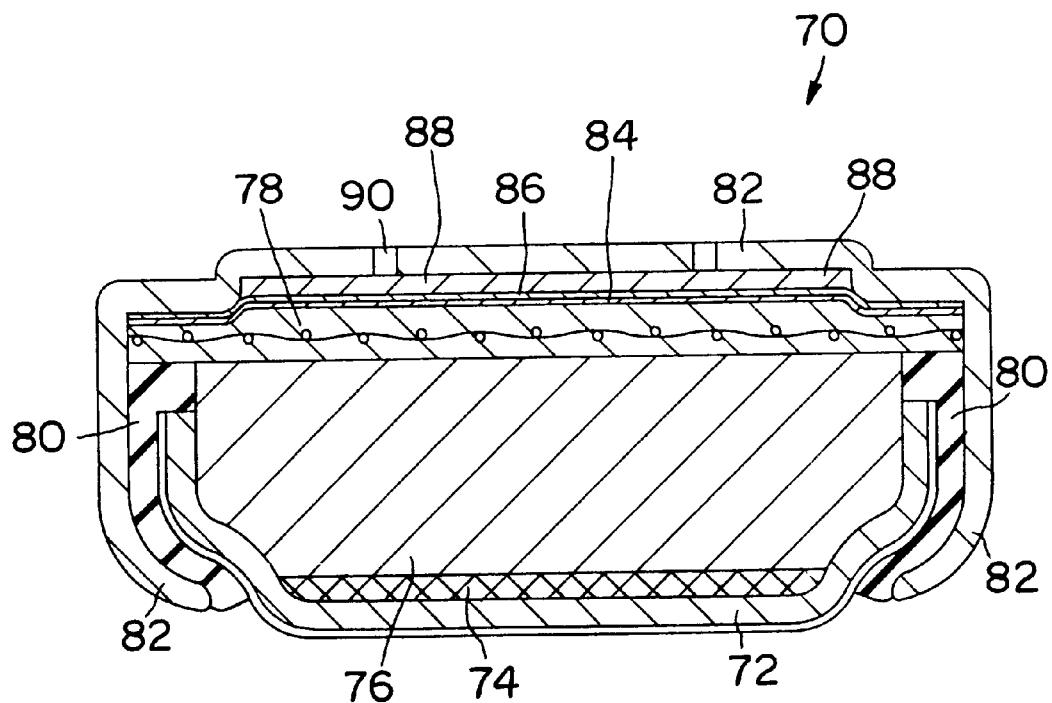
FIG. 5 is a cross-sectional view of a third embodiment of an electrochemical cell in accordance with the present invention.

A third embodiment of an electrochemical cell 70 is shown in FIG. 5 as generally comprising first metal casing 72, anode 74, electrolyte 76, cathode 78, grommet 80, and second metal casing 82. Electrochemical cell 70 is configured for gaseous consumption and/or generation—such as oxygen or hydrogen.

First casing 72 is fabricated primarily from a zinc alloy having an outer layer comprising copper, tin, stainless steel, or other metallic species. While first casing 72 is shown as substantially cup-shaped, several other geometric configurations are likewise contemplated for use.

Anode 74 is preferably a substantially circular zinc alloy mesh, and is conductively attached to the interior surface of first casing 72. The zinc alloy of anode 74 generally contains zinc metal with minimal amounts of impurities and includes alloying elements such as lead, gallium, bismuth, or indium.

Electrolyte 46 is preferably an aqueous solution of NaOH or KOH, however, other aqueous alkaline solutions are also suitable for use, including, aqueous solutions of Group 1A and 2A hydroxides.

Cathode 78 is preferably fabricated from a thin metallic sheet and generally comprises active carbon as the conductive material, metal oxide catalyst for the electrochemical reactions, and polytetrafluoroethylene dispersed throughout as the hydrophobic binder. An electro-catalyst suitable for the cathode reaction when the electrochemical cell is a hydrogen generating cell, includes commercially available Raney nickel or high surface area nickel metal powder. When the electrochemical cell is oxygen consuming, suitable cathode catalysts include high surface area powders of transition metal oxides—such as manganese, silver, and mixtures thereof Inasmuch as the aqueous alkaline electrolyte does not contain any gelled zinc powder, it can be in direct contact with the cathode and therefore, there is no need for a separator. This composite material is pressed onto either nickel or nickel plated steel mesh material and then pressed into fluoropolymer sheet 84 which is hydrophobic in nature and acts as a moisture barrier. While sheet 84 has been disclosed, for illustrative purposes only, as fabricated from a fluoropolymer, any one of a number of hydrophobic materials known to those having ordinary skill in the art are likewise contemplated for use.

Member layer 86 is interposed between sheet 84 and second casing 82 and serves to limit the air diffusion passing through the cathode (in Zn—H$_2$ cells). Optionally, porous diffusion layer 88, such as filter paper, is positioned adjacent to the interior of second casing 82. A grommet 80, preferably fabricated from nylon, serves to electrically isolate first casing from second casing 72 and 82, respectively.

Second casing 82 is preferably comprised of nickel plated stainless steel and is in direct contact with cathode 78. Second casing 82 includes aperture 90 for permitting gaseous species to pass into and out of cell 70.

Electrolytic cell 70 can also include corrosion inhibitors to extend the storage life of the battery. Such corrosion inhibitors are common, and any one of a number of conventional inhibitors are appropriate for use.

A significant advantage to the configuration in cell 70 is that it eliminates the presence of powdered zinc material in the electrolyte resulting in a greater cell capacity because the cell can now hold more electrolyte and/or more active cathode material. A second advantage of this cell is that it eliminates the separator used in the prior art, thus requiring fewer components.

The foregoing description and drawings merely explain and illustrate the invention and the invention is not limited thereto except insofar as the appended claims are so limited, as those skilled in the art who have the disclosure before them will be able to make modifications and variations therein without departing from the scope of the invention.

What is claimed is:

1. An anode for use in an electrochemical cell, wherein the electrochemical cell includes a metallic casing, an electrolyte, a cathode, and an anode within the metallic casing, the anode comprising:
   at least a portion of the metallic casing; and
   at least one perforated electrochemically zinc based sheet conductively attached to the metallic casing.

2. The invention according to claim 1, wherein the zinc based sheet includes alloying elements selected from the group consisting of indium, lead, gallium, bismuth, and mixtures thereof.

3. The invention according to claim 1, wherein the electrochemical cell comprises at least one of a button cell, a flat cell, and a cylindrical cell.

4. The invention according to claim 1, wherein the perforated electrochemically zinc based sheet is at least partially wound in a coil configuration.

5. The invention according to claim 1, wherein the perforated electrochemically zinc based sheet comprises at least one layer of material, the at least one layer being conductively associated with the casing.

6. The invention according to claim 1, wherein the cathode comprises at least one of a wound bobbin and a pellet electrode.

7. An electrochemical cell comprising:
   a casing having at least a portion constructed from a metal;
   an anode which comprises;
   at least a portion of the casing; and
   at least one perforated electrochemically zinc based active material conductively attached to the casing;
   a cathode;
   an insulating microporous separator positioned between the anode and cathode; and
   an alkaline electrolyte associated with the anode and cathode through the microporous separator.

8. The invention according to claim 7, wherein the zinc based sheet of the anode includes alloying elements selected from the group consisting of indium, lead, gallium, bismuth, and mixtures thereof.

9. The invention according to claim 7, wherein the electrochemical cell comprises at least one of a button cell, a flat cell, and a cylindrical cell.

10. The invention according to claim 7, wherein the perforated electrochemically zinc based sheet is at least partially wound in a coil configuration.

11. The invention according to claim 7, wherein the perforated electrochemically zinc based sheet comprises at least one layer of material, the at least one layer being conductively associated with the casing.

12. The invention according to claim 7, wherein the alkaline electrolyte is fabricated from at least one of the group consisting of Group 1A and Group 2A hydroxides.

13. The invention according to claim 7, wherein the cathode comprises at least one of a wound bobbin type and a pellet type electrode.

14. An electrochemical cell comprising:
   a first casing having at least a portion constructed from a metal;
   an anode which comprises.
   at least a portion of the first casing; and
   at least one perforated electrochemically zinc based active material conductively attached to the first casing;
   a cathode structured to be substantially gas permeable and partially hydrophobic;
   an alkaline electrolyte in direct contact with the anode and cathode;
   an insulating grommet electrically insulating the casing from the gas permeable cathode;
   a second casing having at least one aperture through which a gas may diffuse; and
   a gas permeable hydrophobic membrane positioned between the cathode and the aperture.

15. A process for fabricating an electrochemical cell comprising the steps of:
   fabricating an anode which comprises at least a portion of a casing constructed from a metal and at least one perforated electrochemically zinc based active material conductively attached to the casing;
   associating a cathode with the electrochemical cell;
   associating an insulating microporous separator between the anode and cathode; and
   introducing an alkaline electrolyte to the anode and cathode through the microporous separator.

16. The process according to claim 15, wherein the step of fabricating the anode includes the step of associating zinc with alloying elements selected from the group consisting of indium, lead, gallium, bismuth, and mixtures thereof.

17. The process according to claim 15, wherein the step of fabricating the anode includes the step of attaching the anode to the casing of at least one of the group consisting of a button cell casing, a flat cell casing, or a cylindrical cell casing.

18. The process according to claim 15, wherein the step of fabricating the anode includes the step of at least partially winding the electrochemically zinc based sheet into a coil configuration.

19. The process according to claim 15, wherein the step of fabricating the anode includes the step of applying at least one layer of the electrochemically zinc based sheet onto a casing and, in turn, conductively attaching the at least one layer thereto.

20. The process according to claim 19, wherein the step of introducing the alkaline electrolyte includes the step of introducing an electrolyte selected from at least one of the group consisting of Group 1A and Group 2A hydroxides.

21. The process according to claim 15, wherein the step of associating a cathode includes the step of associating a cathode fabricated from at least one of a wound bobbin and pelletized.

* * * * *

UNITED STATES PATENT AND TRADEMARK OFFICE
CERTIFICATE OF CORRECTION

| | | |
|---|---|---|
| PATENT NO. | : 6,060,197 | Page 1 of 1 |
| DATED | : May 19, 2000 | |
| INVENTOR(S) | : McEvoy et al. | |

It is certified that error appears in the above-identified patent and that said Letters Patent is hereby corrected as shown below:

Column 6,
Line 12, after conductive material insert -- , --.
Line 56, after thereof insert -- . --.

Column 7,
Line 54-55, after based delete "active material' and insert instead -- sheet --.

Column 8,
Line 19, after based delete "active material" and insert instead -- sheet --.
Line 34, after based delete "active material" and insert instead -- sheet --.

Signed and Sealed this

Twenty-eighth Day of August, 2001

Attest:

*Nicholas P. Godici*

NICHOLAS P. GODICI
*Attesting Officer*  *Acting Director of the United States Patent and Trademark Office*